3,591,690
METHOD OF TREATMENT OF DIARRHEA IN PIGLET OF 2-4 WEEKS OF AGE
Kiyoshi Iwaya, 5-16-3 Satsukigaoka, Ikeda-shi, Osaka Prefecture, Japan
No Drawing. Continuation-in-part of abandoned application Ser. No. 604,558, Dec. 27, 1966. This application May 8, 1969, Ser. No. 823,162
Claims priority, application Japan, Feb. 19, 1966, 41/10,175
Int. Cl. A61k *17/12, 17/16*
U.S. Cl. 424—243        9 Claims

ABSTRACT OF THE DISCLOSURE

Diarrhea in piglets of two to four weeks of age is successfully treated with the aid of therapeutic compositions possessing specific activity against such piglet diarrhea and comprising as active ingredient betamethasone, dexamethasone, prednisolone prednisone, paramethasone, methylprednisolone, triamcinolone, hydrocortisone or cortisone.

---

This is a continuation-in-part application of applicant's copending U.S. applications, Ser. No. 604,558, filed Dec. 27, 1966, and now abandoned.

This invention relates to the treatment of diarrhea in piglets of 2-4 weeks of age. More particularly, the present invention relates to treatment with the aid of a pharmaceutical composition containing adrenal corticoid as an active ingredient.

Recently, with increasing scale of pig breedings, it has become a serious problem—both in epidemiology and of enterprise for pig breeders—that suckling piglets of 2-4 weeks of age frequently suffer from specific diarrhea.

Generally, the problem essentially disappears with piglets of over five weeks of age.

In general, piglets farrowed normally from a sound dam grow favorably for the first week after birth but sometimes begin to excrete loose yellowish white feces at about the second week and then begin to have violent water diarrhea without color, which diarrhea is called "milk scour" or "pig scour." Once the diarrhea breaks out, it spreads easily from piglet to piglet in a litter. The mortality from such diarrhea is estimated less than 15% but sometimes mounts to 30% and the afflicted piglets, even if they survive do not grow favorably and finally set back in growth in that they suffer from chronic diarrhea. Consequently, such pigs may not be marketable.

For pig breeders, damage caused by such a diarrhea is so heavy, that available therapy has long been a desideratum. It has been known that administration of a certain kind of sulfa drug or antibiotic to the piglet of 2-4 weeks of age has some preventive effects with respect of milk scour, however, such precedingly employed medicaments are not too effective for the therapeutic purpose in view and most of the once-afflicted piglets may not escape becoming a "stunted growth" pig.

At the period of disappearance of antibodies, derived from the colostrum, in the serum of a piglet of 2-4 weeks of age, certain strains of *Escherichia coli* proliferate rapidly in the duodenum and in the upper part of the small intestine, where a sort of endotoxin is produced. Thus-produced endotoxin is transferred into the serum through the intestinal walls and consequently provokes a reaction, which is thought to be a main cause of the 2-4 weeks piglet diarrhea. This type of diarrhea is clearly different etiologically, clinically and pathologically from so-called neonatal or new born colibacillosis which occurs in a piglet of 2-3 days of age. Moreover, for the purpose of inducing sows to farrow more frequently, pig breeders prefer to wean a piglet from the dam at an early time, namely, at about the fifteenth day of age, and such an early weaning tends to induce diarrhea symptoms in the piglet.

The object of the present invention is to provide a method of treating diarrhea in 2-4 weeks piglets with the aid of therapeutic compositions possessing specific activities against such piglet diarrhea. The invention supplies a need in the pig industry and will represent a significant contribution to the development of such industry.

Active ingredients of the present invention are adrenal corticoids selected from the group consisting of betamethasone dexamethasone, prednisolone, prednisone, paramethasone, methylprednisolone, triamcinolone, hydrocortisone and cortisone. The pharmaceutical compositions can be formulated as powders, tablets, capsules, suspensions, injections and elixirs, and preferably as a syrup forms for the reason that pigs are generally fond of sweet taste.

According to this invention, it has been determined that the following values are substantially equivalent with regard to therapeutic effects against 2-4 weeks piglet diarrhea:

|   | Milligrams |
|---|---|
| Betamethasone | 0.5–0.6 |
| Dexamethasone | 0.75 |
| Prednisolone | 5.0 |
| Prednisone | 5.0 |
| Paramethasone | 1.5–2.0 |
| Methylprednisolone | 4.0 |
| Triamcinolone | 4.0 |
| Hydrocortisone | 20.0 |
| Cortisone | 25.0 |

Further, therapeutic dosages of the active ingredients are as follows:

Single dosage per piglet per kilogram of body weight per day

|   | Milligrams |
|---|---|
| Betamethasone | 0.1–0.5 |
| Dexamethasone | 0.1–0.75 |
| Prednisolone | 1.0–5.0 |
| Prednisone | 1.0–5.0 |
| Paramethasone | 0.3–1.5 |
| Triamcinolone | 0.5–4.0 |
| Methylprednisolone | 0.5–4.0 |
| Hydrocortisone | 5.0–25.0 |
| Cortisone | 5.0–25.0 |

The afflicted piglets generally recover from the diarrhea upon administration of the above dosage of active ingredients for one to six days.

Typical examples are shown below:

Therapeutic effects are based on observation of the following points.

State of faeces:

(a) Normal stool—of which shape was not destroyed.
(b) Loose stool—of which shape was destroyed a little but not far spread.
(c) Diarrhea stool—of which shape was destroyed and spread or was liquid.

Appearance of buttocks:

Presence or absence of diarrhea was indicated by the dampness and contamination conditions around the anus and perineum.

Example 1.—Administration of betamethasone (a) Oral administration.—A syrup which was prepared so as to contain 1 mg. of betamethasone in 1 ml., was administered to piglets of 14–22 days of age which had had the diarrhea for 3–8 hours. A single dose per pig was 0.5 mg. and was administered once or twice per day for 1–4 days according to symptoms. Observation was made for six days.

| Race | No. of afflicted pigs | Days of age | Dose (0.5 mg./pig) | | | | | No. of recovered pigs | Ratio of effectiveness (percent) |
| --- | --- | --- | --- | --- | --- | --- | --- | --- | --- |
| | | | Once/ day for 1 day | Once/ day for 2 days | Twice/ day for 2 days | Twice/ day for 3 days | Twice/ day for 4 days | | |
| Yorkshire | 30 | 14–22 | 10 | 8 | 9 | 2 | 1 | 29 | 96.6 |
| F₁ YxL | 45 | 15–20 | 11 | 20 | 5 | 9 | | 44 | 97.0 |
| Landrace | 9 | 14–19 | | | 8 | 1 | | 9 | 100.0 |

For reference, three afflicted but not medicated piglets of F₁ YxL of 15–20 days of age were observed. Intervals of the diarrheas shortened gradually and the piglets died on the third day from outbreak of the diarrhea.

(b) Intramuscular injection.—A solution of betamethasone disodium phosphate, which was prepared as equivalent to 4 mg. of betamethasone in 1 ml. of sterile water, was injected to piglets of 12–21 days of age at after 3–5 hours from outbreak of the diarrhea. A single dose was equivalent to 0.1 mg. of betamethasone per kilograms of bodyweight per piglet.

For reference, three afflicted piglets of F₁ YxL of 21 days of age were administered a long acting sulfa drug at after 1 hour from outbreak of diarrhea. Watery stools didn't stop and the pigs became dehydrated states and died on the fourth day from the outbreak.

(b) Intramuscular injection.—A solution of prednisolone sodium hemisuccinate, which was prepared as equivalent to 20 mg. of prednisolone in 1 ml. of sterile water, was injected to piglets of 16–19 days of age at after 4–5 hours from outbreak of the diarrhea. A single dose

| Race | No. of afflicted pigs | Days of age | Dose (0.1 mg./kg.) | | | | No. of recovered pig | Ratio of effectiveness (percent) |
| --- | --- | --- | --- | --- | --- | --- | --- | --- |
| | | | Once/ day for 1 day | Once/ day for 2 days | Twice/ day for 2 days | Twice/ day for 3 days | | |
| Yorkshire | 40 | 12–24 | 30 | 7 | 2 | 1 | 39 | 97.5 |
| F₁ YxL | 62 | 17–21 | 50 | 8 | 4 | | 62 | 100.0 |
| Landrace | 10 | 15 | 2 | 7 | 1 | | 10 | 100.0 |

Example 2.—Administration of prednisolone (a) Oral administration.—A syrup which was prepared so as to contain 10 mg. of prednisolone in 1 ml., was administered to piglets of 12–20 days of age at after 4–6 hours from outbreak of the diarrhea. A single dose per piglet was 1–5 mg. per kilogram body-weight according to symptoms and was administered once or twice per day for 1–3 days. Observation was made for six days.

per pig was equivalent to 10 mg. of prednisolone and was administered once or twice per day for 1–3 days.

| Race | No. of afflicted pigs | Days of age | Dose (10 mg./pig) | | | | | No. of recovered pigs | Ratio of effectiveness (percent) |
| --- | --- | --- | --- | --- | --- | --- | --- | --- | --- |
| | | | Once/ day for 1 day | Once/ day for 2 days | Twice/ day for 1 day | Twice/ day for 2 days | Twice/ day for 3 days | | |
| F₁ YxL | 40 | 16–19 | 10 | 10 | 14 | 1 | 5 | 40 | 100.0 |

Example 3.—Oral administration of dexamethasone

A syrup which was prepared so as to contain 1 mg. of dexamethasone in 1 ml., was administered to piglets of 14–18 days of age at after 4 hours from outbreak of the diarrhea. A single dose per pig was equivalent to 0.2 mg. per kilogram of body-weight.

| Race | No. of afflicted pigs | Days of age | Dose (0.2 mg./kg. body-weight) | | | No. of recovered pigs | Ratio of effectiveness (percent) |
| --- | --- | --- | --- | --- | --- | --- | --- |
| | | | Once/ day for 1 day | Twice/ day for 1 day | Twice/ day for 2 days | | |
| F₁ YxL | 30 | 17 | 10 | 7 | 13 | 30 | 100.0 |
| Yorkshire | 20 | 19–20 | | | 20 | 19 | 95.0 |

| Race | No. of afflicted pigs | Days of age | Dose (1.5 mg./kg.) | | | | No. of recovered pigs | Ratio of effectiveness (percent) |
| --- | --- | --- | --- | --- | --- | --- | --- | --- |
| | | | Once/ day for 1 day | Once/ day for 2 days | Twice/ day for 2 days | Twice/ day for 3 days | | |
| F₁ YxL | 60 | 12–16 | 10 | 43 | 5 | 2 | 59 | 98.3 |
| F₁ YxL* | 41 | 15–20 | 27 | 10 | | 4 | 41 | 100.0 |

*The group was chosen from pigs which had been medicated with sulfa drug at the period of 6–10 days of age for the preventive purpose but yet had the diarrhea.

Examples 4–8.—Administrations of prednisone, paramethasone, triamcinolone, methylprednisolone and hydrocortisone

| Race | Sex | Days of age at outbreak of diarrhea | Dose per kg. of body-weight per pig | States of diarrhea | General findings |
|---|---|---|---|---|---|
| Landrace | M | 20 | Orally, 1.0 mg./kg. of prednisone, just after the outbreak of diarrhea. | Normal stools were seen 8 hours after the medication. | |
| Do | F | 10 | Orally, 2 mg./kg. of prednisone, 5 hours after the outbreak. | Normal stools were seen 6 hours after the medication. | |
| $F_1$ YxL | F | 21 | Orally, 0.3 mg./kg. of paramethasone, just after the outbreak. | Normal stools were seen 7 hours after the medication. | |
| $F_1$ YxL | M | 21 | Orally, 0.37 mg./kg. of paramethasone, 24 hours after the outbreak and the same dose 12 hours later and 0.7 mg./kg., 12 hours later. | Approximately loose stools were seen 7 hours and approximately normal stools 12 hours after the medication. | |
| Landrace | F | 11 | Orally, 1.0 mg./kg. of triamcinolone, 6 hours after the outbreak and the same dose 24 hours later. | Loose stools were seen 7 hours and approximately normal stools 24 hours and normal stools 36 hours after the medication. | |
| $F_1$ YxL | M | 14 | Orally, 1.0 mg./kg. of triamcinolone, 24 hours after the outbreak and the same dose 12 hours later. | Loose stools were seen 10 hours and normal stools 20 hours after the medication. | |
| $F_1$ YxL | F | 14 | Orally, 3.0 mg./kg. of methylprednisolone just after the outbreak. | Normal stools were seen 6 hours after the medication. | |
| $F_1$ YxL | M | 13 | Orally, 5.0 mg./kg. of hydrocortisone, 1 hour after the outbreak and the same dose 24 hours later. | Approximately loose stools were seen, which were changed to approximately normal stools 24 hours and normal stools were seen 48 hours after the medication. | Administered the drug in the form of mixture with sugar. |

In addition to the above data, combined administration of the composition of the present invention and suitable sulfa drugs or antibiotics for piglets is recommended when the piglets are infected by other bacilli.

In each of the examples, M refers to Male, F refers to Female, and $F_1$ YxL refers to the first filial generation born between female Yorkshire and male Landrace.

What is claimed is:

1. A method of treatment of diarrhea in a piglet of two to four weeks of age after birth which comprises administering to said afflicted piglet an adrenal corticoid selected from the group consisting of
   0.1–0.5 mg. of betamethasone,
   0.1–0.75 mg. of dexamethasone,
   1.0–5.0 mg. of prednisolone,
   0.3–1.5 mg. of paramethasone,
   0.5–4.0 mg. of triamcinolone,
   1.0–5.0 mg. of prednisone,
   0.5–4.0 mg. of methylprednisolone,
   5.0–25.0 mg. of hydrocortisone, and
   5.0–25.0 mg. of cortisone,
in the form of a dosage unit, the amounts of the active ingredients being administered per kilogram of body weight of said piglet per day.

2. A method according to claim 1 wherein the active ingredient dexamethasone is administered in the amount of 0.1–0.75 mg.

3. A method according to claim 1 wherein the active ingredient prednisolone is administered in the amount of 1.0–5.0 mg.

4. A method according to claim 1 wherein the active ingredient prednisone is administered in the amount of 1.0–5.0 mg.

5. A method according to claim 1 wherein the active ingredient paramethasone is administered in the amount of 0.3–1.5 mg.

6. A method according to claim 1 wherein the active ingredient triamcinolone is administered in the amount of 0.5–4.0 mg.

7. A method according to claim 1 wherein the active ingredient methylprednisolone is administered in the amount of 0.5–4.0 mg.

8. A method according to claim 1 wherein the active ingredient hydrocortisone is administered in the amount of 5.0–25.0 mg.

9. A method according to claim 1 wherein the active ingredient cortisone is administered in the amount of 5.0–25.0 mg.

References Cited

UNITED STATES PATENTS 2,607,716   8/1952   Link _____ 424—331

OTHER REFERENCES

Current Therapy, 1965, pp. 262–264.

SAM ROSEN, Primary Examiner